United States Patent [19]
Sugiki et al.

[11] Patent Number: 5,188,392
[45] Date of Patent: Feb. 23, 1993

[54] STEERING SYSTEM

[75] Inventors: Akio Sugiki, Kariya; Masanobu Ishikawa, Nagoya; Nobuhiro Yoshida; Haruhiko Tanahashi, both of Toyota; Kiyokatsu Miura, Gamagori, all of Japan

[73] Assignee: Aisin Seiki Kabushiki Kaisha, Kariya, Japan

[21] Appl. No.: 841,187

[22] Filed: Feb. 26, 1992

Related U.S. Application Data

[63] Continuation-in-part of Ser. No. 797,167, Nov. 26, 1991, abandoned, which is a continuation of Ser. No. 582,076, Sep. 14, 1991, abandoned.

[30] Foreign Application Priority Data

Sep. 19, 1989 [JP] Japan .............................. 1-109500[U]
Feb. 27, 1991 [JP] Japan ..................................... 3-32771

[51] Int. Cl.$^5$ ............................................... B62D 1/18
[52] U.S. Cl. .................................... 280/775; 280/779; 74/493; 74/496
[58] Field of Search ...................... 280/775, 779, 780; 74/493, 496, 498

[56] References Cited

U.S. PATENT DOCUMENTS

| | | | |
|---|---|---|---|
| 4,539,861 | 9/1985 | Nishikawa | 280/775 |
| 4,541,298 | 9/1985 | Strutt | 280/775 |
| 4,656,888 | 4/1987 | Schmitz | 280/775 |
| 4,785,684 | 11/1988 | Nishikawa et al. | 280/775 |
| 4,796,481 | 1/1989 | Nolte | 280/775 |
| 4,900,059 | 2/1990 | Kinoshita et al. | 280/775 |
| 4,901,593 | 2/1990 | Ishikawa | 280/775 |
| 4,967,618 | 11/1990 | Matsumoto et al. | 280/775 |

FOREIGN PATENT DOCUMENTS 3839808 5/1990 Fed. Rep. of Germany .
111566 4/1989 Japan ................................... 280/775

Primary Examiner—Tamara L. Graysay
Attorney, Agent, or Firm—Finnegan, Henderson, Farabow, Garrett & Dunner

[57] ABSTRACT

A steering system for a vehicle including a fixed body secured to the body of the vehicle, a fixed shaft rotatably supported by the fixed bracket, a movable bracket connected for relative axial movement to the fixed bracket, a movable shaft rotatably supported by the movable bracket and connected to the shaft so as to be axially movable relative to the fixed shaft and rotatable as one unit with the fixed shaft, a driving mechanism disposed on the fixed bracket and connected to move the movable bracket and the movable shaft axially relative to both the fixed bracket and the fixed shaft, and a control mechanism for controlling the level of the frictional force acting between the fixed bracket and the movable bracket. The control mechanism normally maintains the frictional force at a level to ensure rigidity between the fixed and movable brackets, but is operable, upon actuation of the driving mechanism, to reduce the frictional force and thereby decrease resistance to relative axial movement of the fixed and movable brackets.

4 Claims, 6 Drawing Sheets

STEERING SYSTEM

CROSS REFERENCE TO RELATED APPLICATIONS

This is a Continuation-In-Part of U.S. application Ser. No. 07/797,167, filed Nov. 26, 1991, abandoned, which is a File Wrapper Continuation of U.S. application Ser. No. 07/582,076, filed Sept. 14, 1991

BACKGROUND OF THE INVENTION

The present invention relates to a steering system for vehicles and, in particular, to such a steering system having a telescopic operation.

A steering system of the type described above is disclosed in Japanese Patent Application No. 63-15299 (1988), filed by the applicant of the present invention. The prior art comprises a fixed bracket that is secured to a member on a vehicle body, a fixed shaft rotatably supported by the fixed bracket, a movable bracket connected for axial movement to the fixed bracket, a movable shaft connected to the fixed shaft in a manner to be axially movable relative to the axial shaft but rotatable with it as one unit, the movable shaft being rotatably supported by the movable bracket, and a driving mechanism disposed on the fixed bracket and connected to the movable bracket to move the movable bracket, together with the movable shaft, axially relative to both the fixed bracket and the fixed shaft. In this prior art, rigidity of the steering system is established by the frictional force that is generated at the joint of the fixed and movable brackets or the joint of the fixed and movable shafts. Accordingly, to enhance the rigidity of the steering system, it is necessary to increase the frictional force occurring between the fixed and movable brackets or between the fixed and movable shafts. However, if the frictional force is increased, the sliding resistance increases correspondingly, so that smooth sliding of the movable bracket and shaft is sacrificed. In addition, the size of the driving mechanism that causes the movable bracket and shaft to slide increases to be disadvantageous in terms of both space and cost.

SUMMARY OF THE INVENTION

It is an object of the present invention to provide a steering system which is designed so that system rigidity is enhanced without increasing the resistance to sliding of the movable bracket and shaft.

To this end, a steering system for a vehicle is comprised of a fixed body secured to the vehicle body, a fixed shaft rotatably supported by the fixed bracket, a movable bracket connected for relative axial movement to the fixed bracket, a movable shaft rotatably supported by the movable bracket and connected to the shaft so as to be axially movable relative to the fixed shaft and rotatable as one unit with the fixed shaft, a driving mechanism disposed on the fixed bracket and connected to move the movable bracket and the movable shaft axially relative to both the fixed bracket and the fixed shaft, and a control mechanism for controlling the level of the frictional force acting between the fixed bracket and the movable bracket, the control mechanism normally maintaining the frictional force at a level to ensure rigidity between the fixed and movable brackets, but operable, upon actuation of the driving mechanism, to reduce the frictional force and thereby decrease resistance to relative axial movement of the fixed and movable brackets.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and of which.

DESCRIPTION OF THE PREFERRED EMBODIMENTS

One embodiment of the present invention will be described below with reference to the accompanying drawings.

Figure 1:
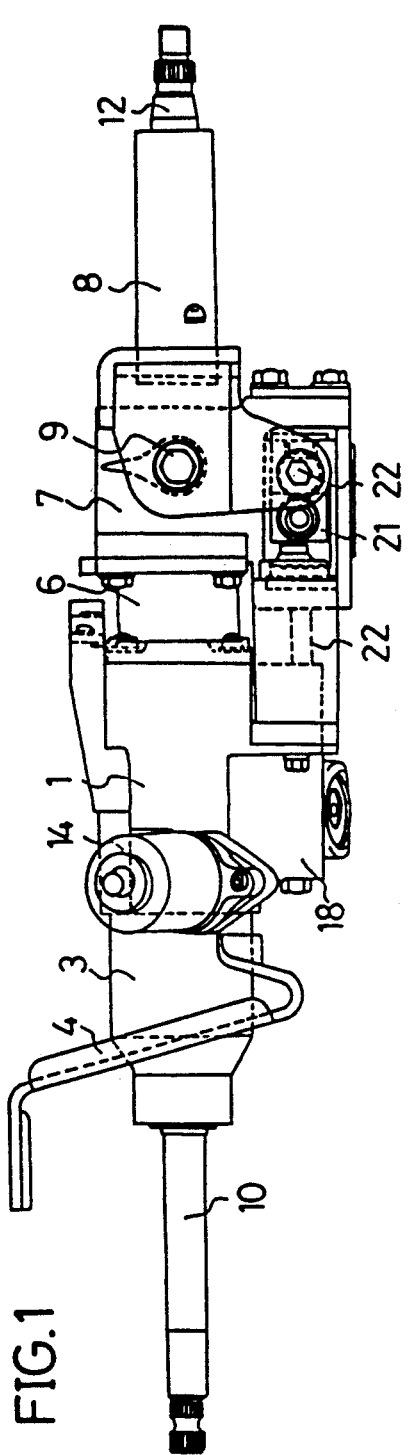
FIG. 1 is a front view of one embodiment of the steering system according to the present invention.
Figure 2:
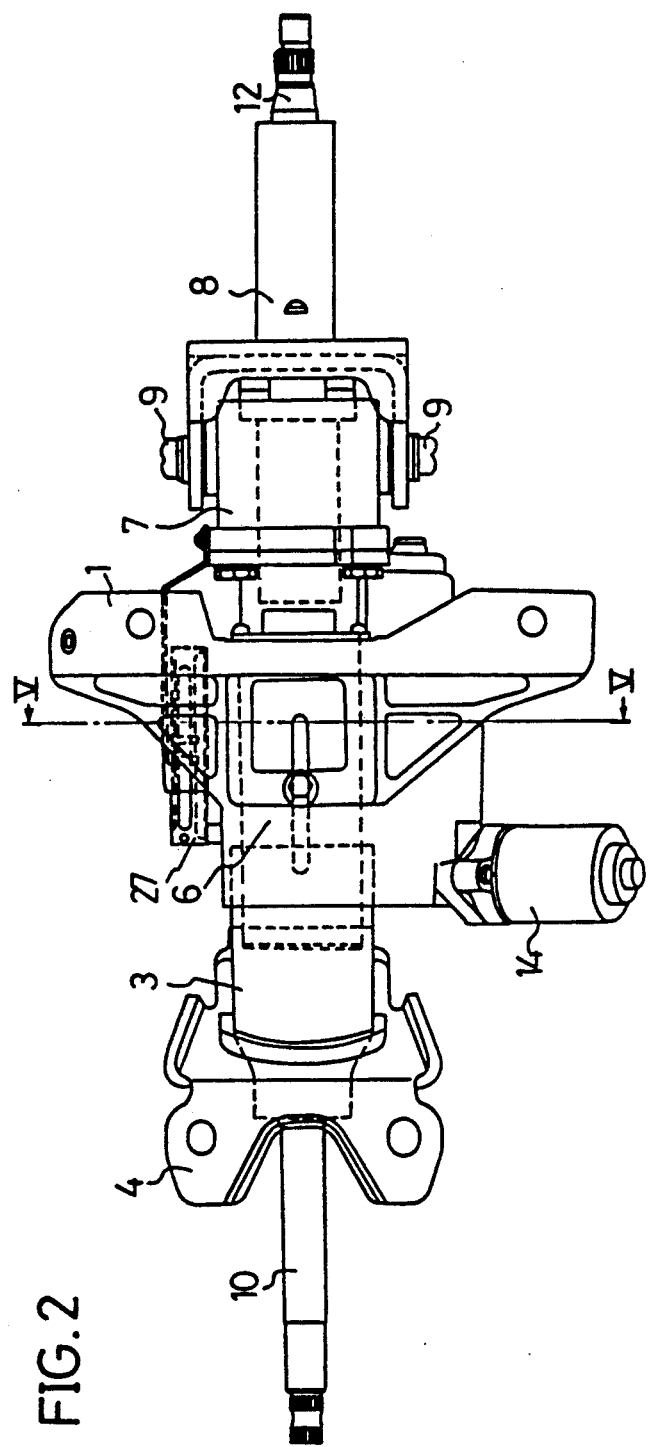
FIG. 2 is a plan view of the embodiment shown in FIG. 1.
Figure 3:
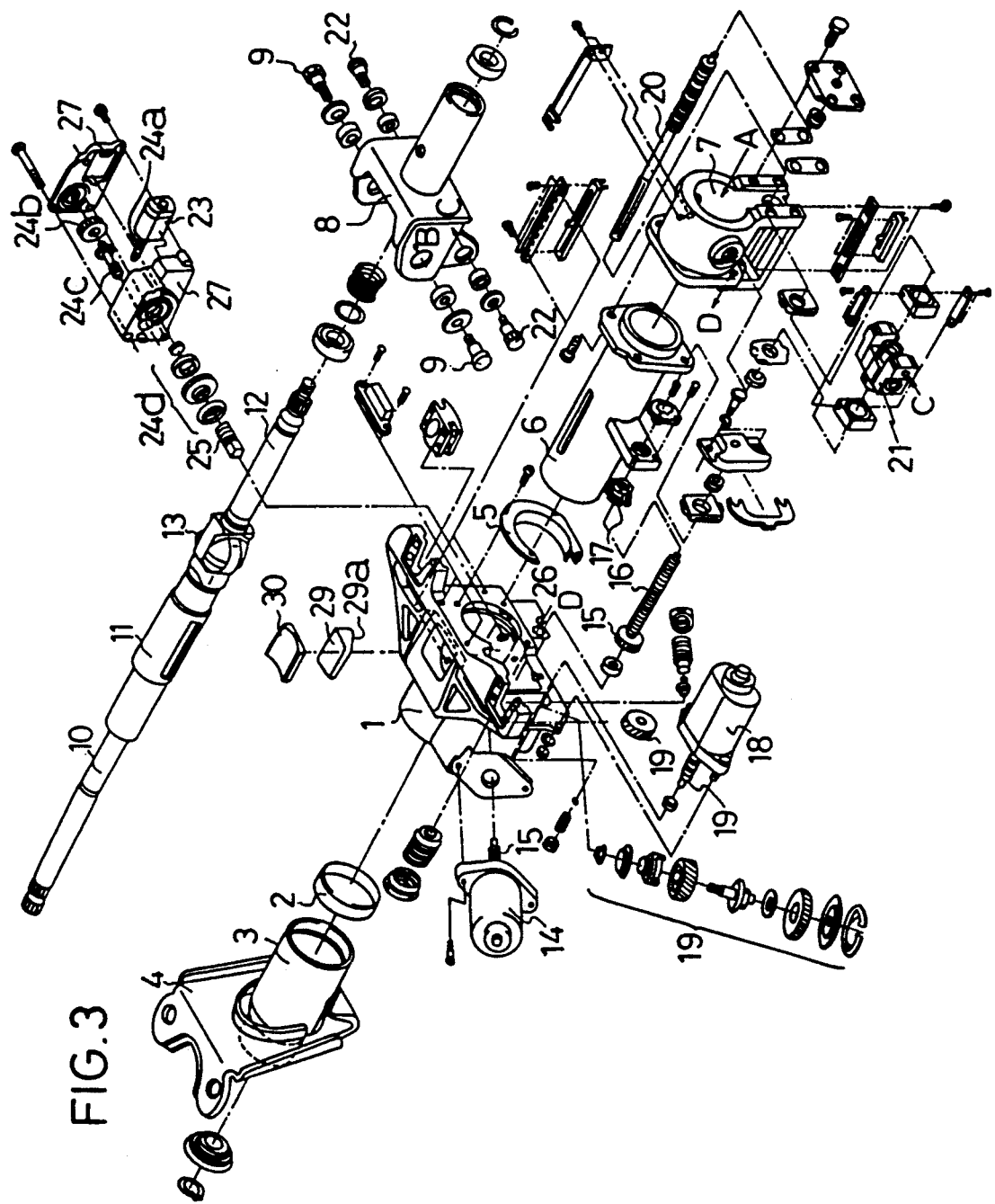
FIG. 3 is an exploded perspective view of the embodiment shown in FIGS. 1 and 2.
Figure 4:
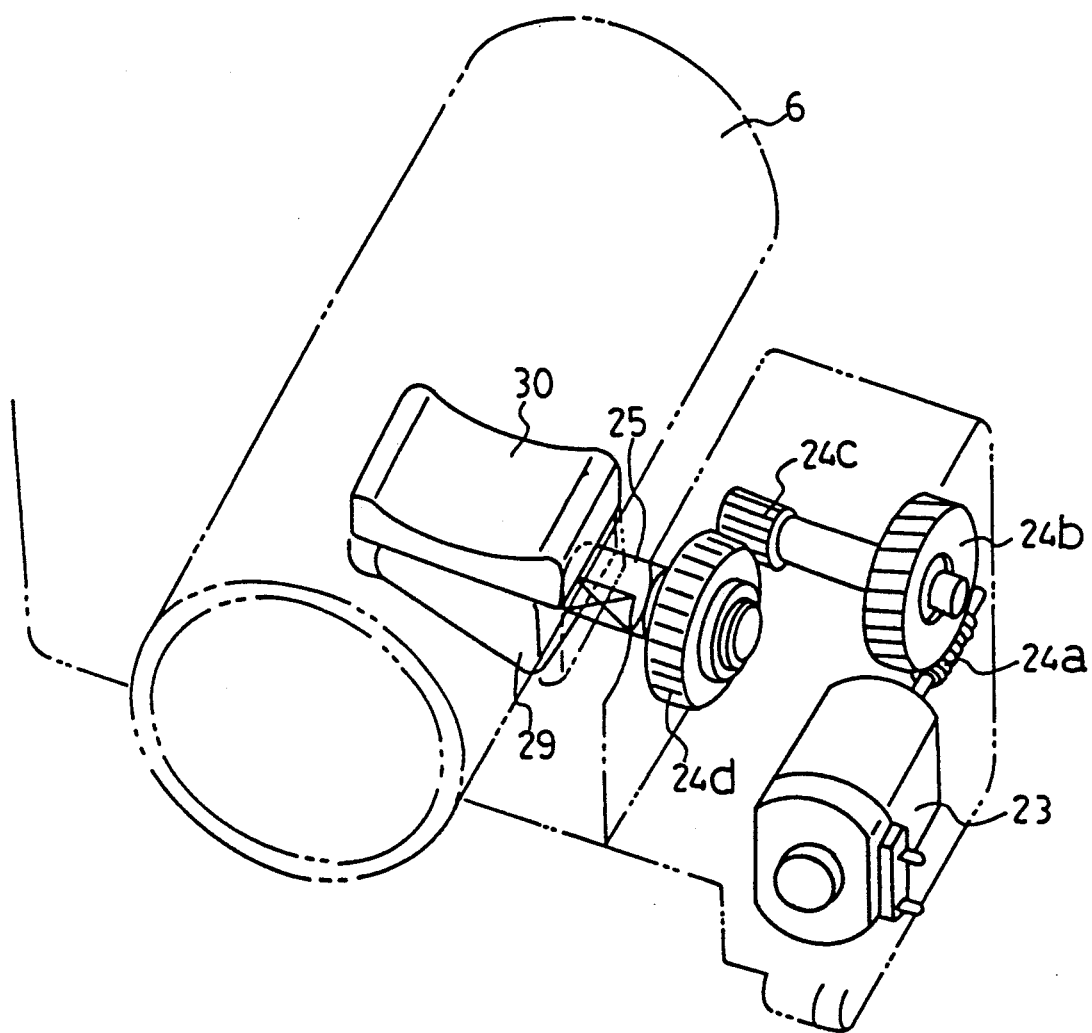
FIG. 4 is a perspective view of an essential part of the embodiment of the present invention.
Figure 5:
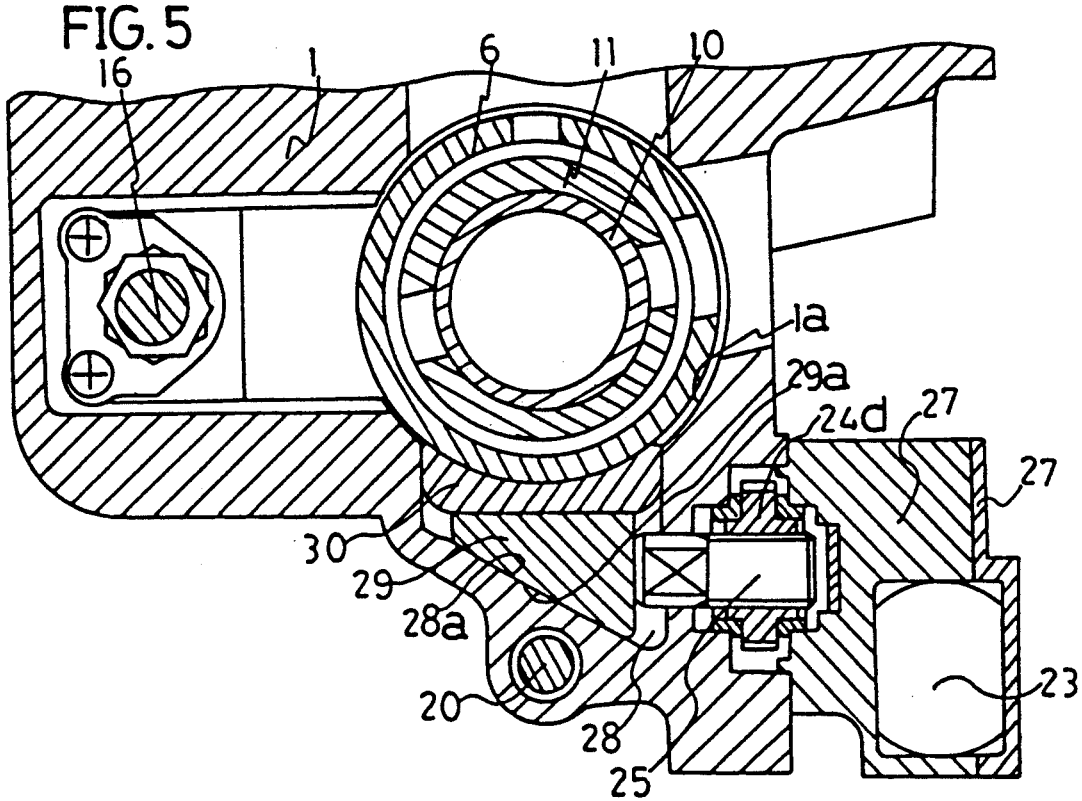
FIG. 5 is a sectional view taken along the line V—V of FIG. 2.
Figure 6:
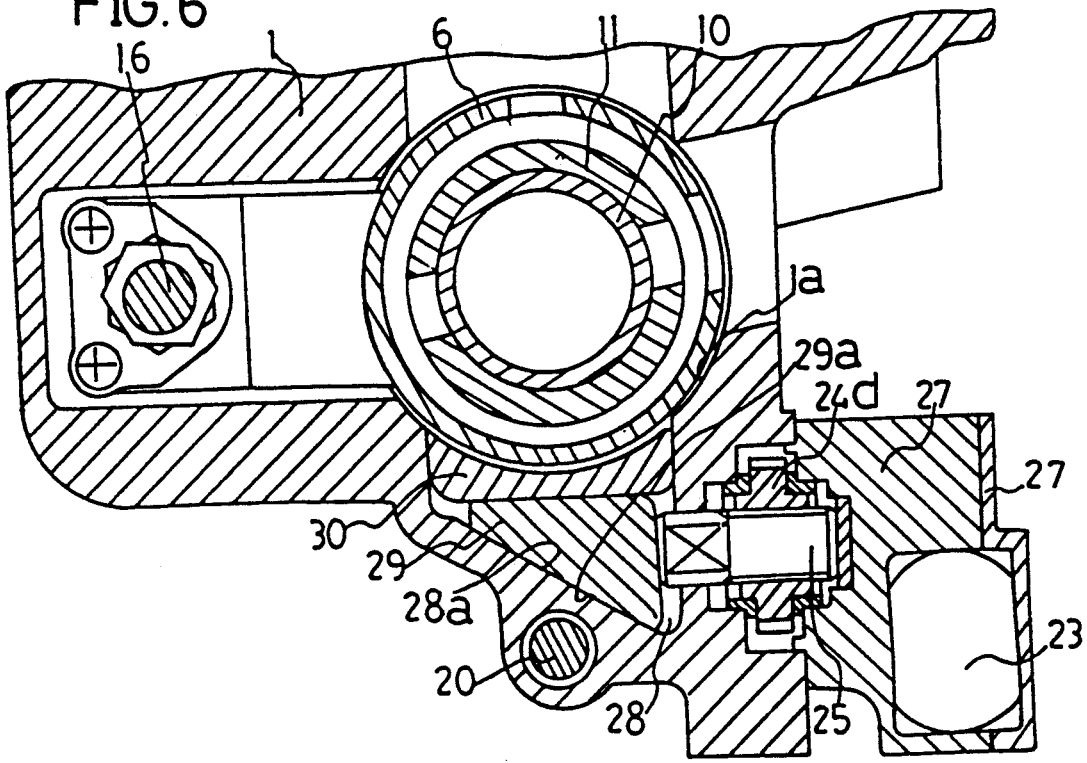
FIG. 6 is a sectional view, which corresponds to FIG. 5, showing the arrangement during a telescopic operation.

In FIGS. 1 to 3, there is illustrated a breakaway bracket 1 having a column tube 3 secured thereto through a bush 2. The column tube 3 and the breakaway bracket 1 are secured as a fixed bracket to a member on a vehicle body through a bracket 4. A telescopic tube 6 is held for axially slidable movement by the breakaway bracket 1 through a bush 5 and the bush 2. A holder 7 is secured to the telescopic tube 6 and together, the tube 6 and the holder 7 establish a movable bracket. A tilt bracket 8 is pivotably supported from the holder 7 by bolts 9. A lower-main shaft 10 is rotatably supported by the breakaway bracket 1 and the column tube 3. Similarly, an upper main shaft 12 is rotatably supported by the tilt bracket 8. A middle movable main shaft 11 is slidably connected to the lower main shaft 10. The middle main shaft 11 is pivotably connected to the upper main shaft 12 through a joint 13 that is located on the middle main shaft 11 in coaxial relation to the bolts 9. The middle main shaft 11 is disposed inside the telescopic tube 6 and the holder 7.

A telescopic motor 14 is secured to the breakaway bracket 1. A telescopic screw 16, which is rotatably supported by the breakaway bracket 1, is connected to a rotating shaft of the telescopic motor 14 through a reduction mechanism 15 comprising a worm 15a and a worm wheel 15b and which are mounted on the breakaway bracket 1. A telescopic nut member 17 is rigidly secured to the telescopic tube 6 and brought into threaded engagement with the telescopic screw 16. The arrangement of the motor 14, the reduction mechanism 15, the nut member 17 and the screw 16 thus exemplify a driving mechanism for moving the movable bracket, represented by the tube 6 and holder 7, and the movable shaft 11 axially relative to the lower fixed main shaft 10 and the fixed bracket represented by the breakaway bracket 1 and the tube 3. In this arrangement, when the telescopic motor 14 is activated, the telescopic screw 16 rotates through the reduction mechanism 15. The rotation of the telescopic screw 16 causes the telescopic nut member 17 to move axially along the telescopic screw 16 by virtue of the threaded engagement. Thus, the telescopic tube 6, the holder 7 and the tilt bracket 8 slide together as one unit relative to the breakaway bracket 1 and the column tube 3. At the same time, the middle main shaft 11 and the upper main shaft 12 slide together a one unit relative to the lower main shaft 10 (i.e., a telescopic operation is realized).

A tilt motor 18 is secured to the breakaway bracket 1. A tilt screw 20, which is rotatably held by the holder 7, is connected to the tilt motor 18 through a reduction mechanism 19 comprising a worm 19a and a worm wheel 19b, which are disposed on the breakaway bracket 1. It should be noted that the reduction mechanism 19 and the tilt screw 20 are in splined connection with each other so that the tilt screw 20 is slidable axially while it is rotated by the reduction mechanism 19, in order to enable the above-described telescopic operation.

A tilt nut member 21 is disposed on the holder 7 in such a manner that the nut member 21 is prevented from sliding axially relative to the holder 7. The tilt nut member 21 is in threaded engagement with the tilt screw 20 and connected to the tilt bracket 8 by bolts 22.

In this arrangement, as the tilt motor 18 is activated, the tilt screw 20 rotates through the reduction mechanism 19. The rotation of the tilt screw 20 causes the tilt nut member 21 to slide axially relative to the tilt screw 20 by virtue of the threaded engagement. Since the tilt nut member 21 is prevented from sliding axially relative to the holder 7, the driving power from the nut member 21 is transmitted to the tilt bracket 8 through the bolts 22. Thus, the tilt bracket 8 pivots vertically about the bolts 9 relative to the holder 7 due to the positional relationship between the bolts 9 and 22 and, at the same time, the upper main shaft 12 pivots vertically about the joint 13 relative to the middle main shaft 11 (i.e., a tilt operation is realized).

FIGS. 3-6 of the drawings illustrate a control mechanism for developing and controlling variable levels of frictional force acting between the bracket, represented by the greakaway bracket 1 and column tube 3, and the movable bracket established by the telescopic tube 6 and holder 7. As shown in FIGS. 3 to 6, the control mechanism includes a lock bolt 25 connected to a lock motor 23 through a reduction mechanism 24 comprising a worm 24a, a worm wheel 24b and gears 24c and 24d. The lock bolt 25 is slidably held through a fitting hole 26 with a non-circular or flat configuration, which is formed in one side of the lower part of the breakaway bracket 1, so that the rotation of the lock bolt 25 is prevented by the fitting hole 26. The lock motor 23 and the reduction mechanism members 24a, 24b and 24c are accommodated in casing 27 which is secured to the side of the lower part of the breakaway bracket 1. The reduction mechanism member 24d and the joint of the member 24d and the lock bolt 25 are accommodated in between the breakaway bracket 1 and the casing 27 while being positioned by a bush which serves as a bearing for the member 24d A space 28 is formed at the lower side of a retaining hole 1a that is provided in the breakaway bracket 1 for retaining the telescopic tube 6, the space 28 having a slant bottom surface 28a A pressing member 29 is disposed within the space 28. The pressing member 29 has a slant surface 29a which is in sliding contact with the slant surface 28a. The pressing member 29 is in contact with the lock bolt 25. Between the pressing member 29 and the telescopic tube 6 is disposed a pressure contact member 30 which is capable of pressing against the telescopic tube 6. In this arrangement, when the lock motor 23 is activated, the lock bolt 25 slides through the reduction mechanism 24 while being guided by the breakaway bracket 1. The sliding movement of the lock bolt 25 forces the pressing member 29 to slide upwardly by virtue of the sliding contact between the slant surfaces 28a and 29a. The sliding movement of the pressing member 29 forces the pressure contact member 30 to slide and firmly press against the telescopic tube 6. Thus, the frictional force occurring between the column tube 6 and the pressure contact member 30 increases sufficiently to ensure the required rigidity of the steering system.

When the lock motor 23 is reversed, the lock bolt 25 slides in the opposite direction to the above, so that the column tube 6 is released from the pressure that is applied from the pressure contact member 30. Thus, the frictional force acting between the column tube 6 and the pressure contact member 30 decreases, and the column tube 6 becomes easy to slide.

Figure 7:
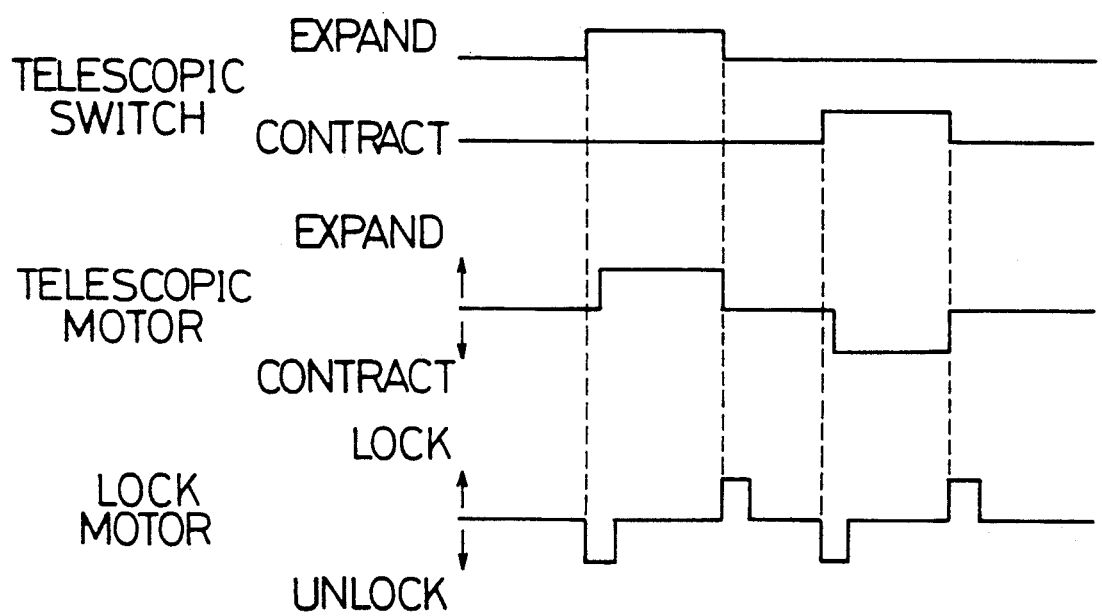
FIG. 7 is a time chart showing the operation of the control mechanism.

The above-described operation may be conducted as shown in the time chart of FIG. 7. More specifically, the pressure contact member 30 is normally pressed against the telescopic tube 6 to obtain sufficient frictional force to ensure the required rigidity. If the telescopic operation switch (not shown) is actuated, the telescopic motor 14 is activated to start a telescopic operation and, at the same time, the lock motor 23 is activated to release the telescopic tube 6 from the pressure applied from the pressure contact member 30, thus the frictional force decreasing. In consequence, the resistance to sliding of the column tube 6 decreases and a smooth telescopic operation is ensured. In response to a telescopic operation completion signal operation of the telescopic motor 14 is suspended, while the lock motor 23 is activated to press the pressure contact member 30 against the telescopic tube 6 again.

Thus, it is possible according to the present invention to increase the rigidity of the steering system and, at the same time, to minimize the sliding resistance. It is therefore possible to realize a smooth telescopic operation while ensuring the required rigidity of the steering system.

Figure 8:
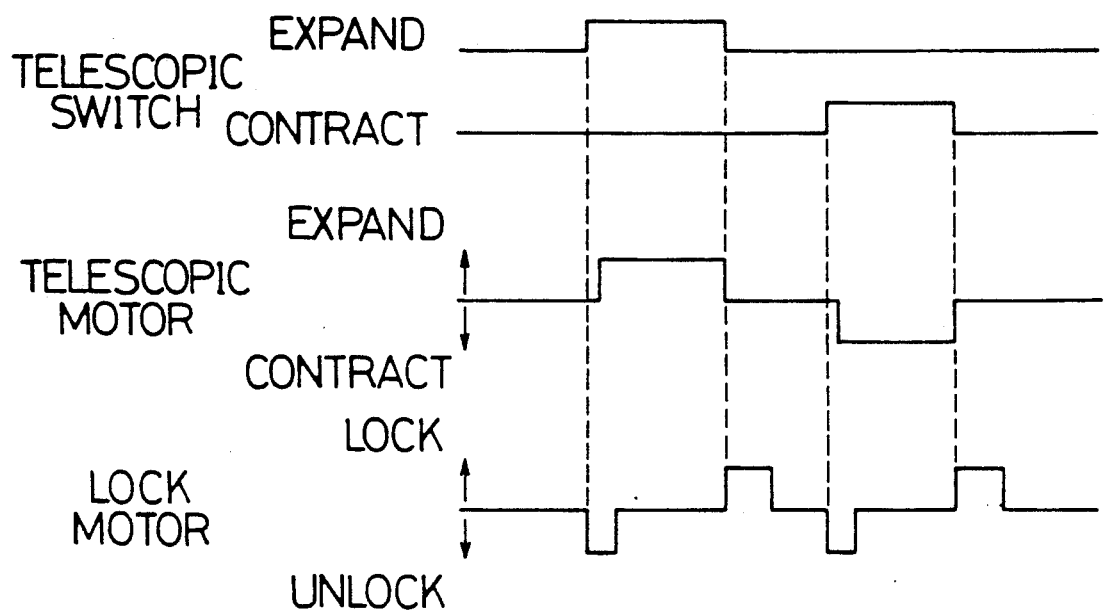
FIG. 8 is a time chart showing the operation of another control mechanism.
Figure 9:
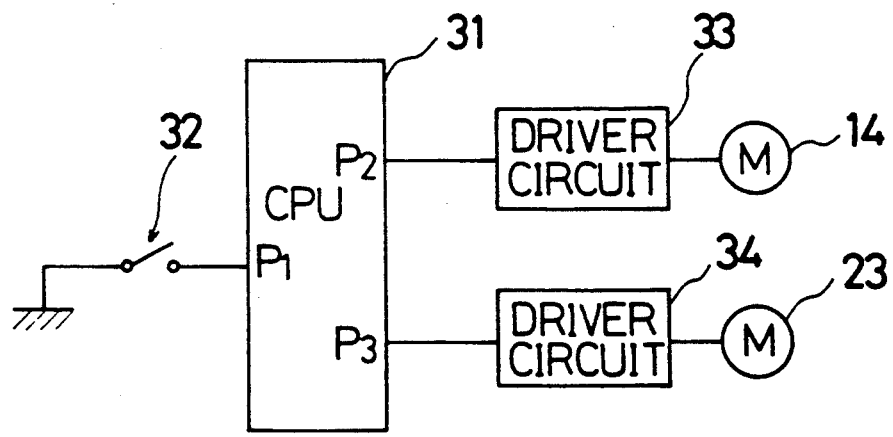
FIG. 9 is a circuit diagram of another control mechanism.

In FIGS. 8 and 9, there is illustrated another mode of the control mechanism. In this mode, a time duration during which the press contact member 30 is pressed against the telescopic tube 6 is set to be longer than a time duration during which the press contact member 30 is released away from the telescopic tube 6. This ensures the complete frictional engagement between the press contact member 30 and the telescopic tube 6 even through a clearance therebetween is generated due to the usage with age or the inaccurate structure of the telescopic tube 6. Such operations which are different in the moving directions of the press contact member 30 can be established by a microprocessor 31 which is set to activate the telescopic motor 14 and the lock motor 23 via a driver circuit 33 and a driver circuit 34, respectively, upon closure of a switch 32 at a dashboard (not shown).

Although the present invention has been described through specific terms, it should be noted here that the described embodiments are not necessarily exclusive and that various change and modifications may be imparted thereto without departing from the scope of the invention which is limited solely by the appended claims.

We claim:

1. A steering system for a vehicle having a body, the system comprising:
    a fixed body secured to the vehicle body;
    a fixed shaft rotatably supported by the fixed bracket;
    a movable bracket connected for relative axial movement to the fixed bracket;
    a movable shaft rotatably supported by the movable bracket and connected to the shaft so as to be axially movable relative to the fixed shaft and rotatable as one unit with the fixed shaft;
    a driving mechanism disposed on the fixed bracket and connected to move the movable bracket and the movable shaft axially relative to both the fixed bracket and the fixed shaft; and
    a control mechanism for controlling the level of the frictional force acing between the fixed bracket and the movable bracket, the control mechanism normally maintaining the frictional force at a level to ensure rigidity between the fixed and movable brackets, but operable, upon actuation of the driving mechanism, to reduce the frictional force and thereby decrease resistance to relative axial movement of the fixed and movable brackets.

2. A steering system according to claim 1, wherein the fixed bracket includes a slant surface and wherein the control mechanism includes a pressure contact member facing the movable bracket, a pressing member carrying the pressure member and slidably along the slant surface of the fixed bracket, and means for moving the pressing member along the slant surface of the fixed bracket, thereby moving the pressure contact member toward and away from the movable bracket 3. A steering system according to claim 2, wherein the moving means comprises an electric motor.

4. A steering system according to claim 2, wherein the moving means comprises an electric motor and a microprocessor for controlling the electric motor in such a manner that a time duration required for moving the pressure contact member toward the movable bracket is longer than a time duration required for moving the pressure contact member and away from the movable bracket.

* * * * *